US012229681B2

United States Patent
Xiao et al.

(10) Patent No.: US 12,229,681 B2
(45) Date of Patent: Feb. 18, 2025

(54) TRUSTED GRAPH DATA NODE CLASSIFICATION METHOD, SYSTEM, COMPUTER DEVICE AND APPLICATION

(71) Applicants: Xidian University, Xi'an (CN); Xi'an Xidian Blockchain Technology CO., Ltd., Xi'an (CN)

(72) Inventors: Yang Xiao, Xi'an (CN); Qingqi Pei, Xi'an (CN); Zhuolin Xing, Xi'an (CN)

(73) Assignees: XIDIAN UNIVERSITY, Xi'An (CN); XI'AN XIDIAN BLOCKCHAIN TECHNOLOGY CO., LTD., Xi'An (CN)

( * ) Notice: Subject to any disclaimer, the term of this patent is extended or adjusted under 35 U.S.C. 154(b) by 945 days.

(21) Appl. No.: 17/325,246

(22) Filed: May 20, 2021

(65) Prior Publication Data

US 2022/0222536 A1    Jul. 14, 2022

(30) Foreign Application Priority Data

Jan. 11, 2021  (CN) .......................... 202110028476.6

(51) Int. Cl.
*G06N 3/084*    (2023.01)
*G06N 3/047*    (2023.01)

(52) U.S. Cl.
CPC .............. *G06N 3/084* (2013.01); *G06N 3/047* (2023.01)

(58) Field of Classification Search
CPC ........ G06N 3/045; G06N 3/047; G06N 3/048; G06N 3/084; G06N 5/01
See application file for complete search history.

(56) References Cited

U.S. PATENT DOCUMENTS

2007/0124579 A1*  5/2007  Haller ................... G06Q 10/10
                                                                713/156
2008/0040428 A1*  2/2008  Wei ........................ G06Q 50/10
                                                                709/204

(Continued)

OTHER PUBLICATIONS

Emil Saucan et al.,"Discrete Ricci curvatures for directed networks," Dec. 12, 2018,Chaos, Solitons and Fractals 118 (2019), pp. 347-359.*

(Continued)

*Primary Examiner* — Omar S Ismail
(74) *Attorney, Agent, or Firm* — Bayramoglu Law Offices LLC

(57) ABSTRACT

A trusted graph data node classification method includes: (1) inputting a topological graph and node features, and calculating a discrete Ricci curvature of the discrete topological graph; (2) preprocessing the curvature and the node features; (3) mapping the curvature, reconstructing original features, and performing a semi-supervised training on graph data containing adversarial examples; and (4) performing a classification on unlabeled nodes. The new method uses a discrete curvature to extract topological information, and uses a residual network to reconstruct node feature vectors without knowing the technical details of the adversarial examples, and without using a large number of adversarial examples for adversarial training. Hence, the system effectively defends against attacks from adversarial examples on the graph data, outperforms the existing mainstream models in terms of accuracy when used in data without adversarial examples, and is thus a trusted node classification system.

20 Claims, 3 Drawing Sheets

(56) References Cited

U.S. PATENT DOCUMENTS

| | | | | |
|---|---|---|---|---|
| 2018/0152468 A1* | 5/2018 | Nor | .................. | H04L 43/045 |
| 2020/0104426 A1* | 4/2020 | Wu | .................. | G06N 20/00 |
| 2021/0034737 A1* | 2/2021 | Khan | .................. | G06F 21/554 |
| 2021/0043283 A1* | 2/2021 | Rong | .................. | G16C 20/80 |
| 2021/0058430 A1* | 2/2021 | Novak | .................. | H04L 63/105 |
| 2021/0248458 A1* | 8/2021 | Robert-Régol | ..... | G06F 16/9024 |
| 2021/0342490 A1* | 11/2021 | Briancon | .................. | G06F 21/14 |
| 2022/0086179 A1* | 3/2022 | Levin | .................. | H04W 12/63 |
| 2022/0101103 A1* | 3/2022 | Fatemi | .................. | G06N 3/088 |

OTHER PUBLICATIONS

Arijit Sehanobish et al.,"Self-supervised edge features for improved Graph Neural Network training," Jun. 23, 2020, Image and Video Processing,2020,pp. 1-8.*

Melanie Weber et al.,"Characterizing Complex Networks with Forman-Ricci curvature and associated geometric flows," Oct. 18, 2016, arXiv:1607.08654v2,pp. 1-24.*

Chandni Saxena et al.,"A Survey of Graph Curvature and Embedding in Non-Euclidean Spaces," Nov. 20, 2020, Neural Information Processing. ICONIP 2020,pp. 127-136.*

Jie Zhou et al., "Graph neural networks: A review of methods and applications," Apr. 8, 2021, AI Open 1 (2020),pp. 57-69.*

Fernando Gama et al.,"Graphs, Convolutions, and Neural Networks," Oct. 29, 2020, IEEE Signal Processing Magazine, vol. 37, Issue: 6, Nov. 2020,pp. 128-136.*

Jiyu Huang et al.,"Recurrent Graph Convolutional Network-Based Multi-Task Transient Stability Assessment Framework in Power System," Jun. 1, 2020, IEEE Access, Colume 8,2020, pp. 93283-93292.*

Qimai Li et al.,"Deeper Insights into Graph Convolutional Networks for Semi-Supervised Learning," Apr. 29, 2018, Thirty-Second AAAI Conference on Artificial Intelligence,vol. 32 No. 1 (2018),pp. 3538-3542.*

Jingjia Huang et al.,"AttPool: Towards Hierarchical Feature Representation in Graph Convolutional Networks via Attention Mechanism," Oct. 2019, Proceedings of the IEEE/CVF International Conference on Computer Vision (ICCV), 2019,pp. 6480-6486.*

Felipe Petroski Such et al., "Robust Spatial Filtering With Graph Convolutional Neural Networks," Aug. 14, 2017, IEEE Journal of Selected Topics in Signal Processing, vol. 11, No. 6, Sep. 2017,pp. 884-893.*

* cited by examiner

TRUSTED GRAPH DATA NODE CLASSIFICATION METHOD, SYSTEM, COMPUTER DEVICE AND APPLICATION

CROSS REFERENCE TO THE RELATED APPLICATIONS

This application is based upon and claims priority to Chinese Patent Application No. 202110028476.6, filed on Jan. 11, 2021, the entire contents of which are incorporated herein by reference.

TECHNICAL FIELD

The present invention pertains to the technical field of network analysis in deep learning applications, and more particularly, relates to a trusted graph data node classification method, system, computer device and application.

BACKGROUND

Currently, the advancement in computer hardware equipment and the explosive growth in computing power enable deep learning and neural network technologies to achieve breakthroughs constantly. The emergence of graph neural networks (GNNs) introduces deep learning and neural networks into the analysis of non-Euclidean data such as graphs. Based on the definition of the frequency spectrum in graph signal processing, researchers have solved, by using the graph Laplacian, the problem that it is difficult to define local convolution operators and aggregation operators when the convolutional neural network (CNN) is transplanted from the field of images and texts to the field of graph data. Since then, GNNs are developing rapidly and have attained remarkable progresses in scientific research and industrial applications.

However, deep learning inevitably faces security issues of attacks from adversarial examples not only in the field of images and texts, but also in the field of graph data. Taking the most widely used graph convolutional network (GCN) as an example, a minor perturbation caused by adding or deleting some edges in the topological graph can dramatically reduce the performance of the classification system. For example, when the adversarial example generation model Mettack is used to add a 5% perturbation to the original graph data, it can cause a reduction of 13% or higher in the classification accuracy of the GCN. Other adversarial example techniques, including targeted attacks such as Nettack, add perturbations to the target node to fool the model to misjudge the specified node. The existence of adversarial examples has seriously hindered the application of GNNs in some areas that require high security and stability. For example, in the credit prediction system of a bank, some people with low credit can disguise themselves by adding some friends with high credit. In a recommender system, some spammers may create fake followers to increase the influence of fake news.

At present, the research on the defense against adversarial examples in graph data or trusted graph neural network systems is still in its infancy. The prior art includes the following technical solutions. The first existing technique uses feature similarity of nodes to clean the topology of the input graph data, in which a new topological structure is constructed by removing the edges between nodes with low similarity, and then input to a given GNN model for training and prediction. The second existing technique extracts topological information by means of singular value decomposition, uses the high-order characteristics of adversarial examples and low-order singular values to perform low-rank approximation on the classification results to avoid attacks from the adversarial examples. The third existing technique uses an attention mechanism and a probability theory model to express the Gaussian distribution as the hidden layer node features of the GNN, and relies on the attention mechanism to assign weights to neighboring nodes. The fourth existing technique uses the low-order and sparse characteristics of natural graph data to perform training on a stack topology to learn a new topology to replace the original topology under attack. The fifth existing technique uses a large number of adversarial examples to perform adversarial training on the model.

In summary, the prior art has the following problems: (1) The existing data cleaning techniques (the first existing technique and the fourth existing technique) use node feature similarity or low-order characteristics of graph data, which causes the following two problems. On one hand, for some graph data analysis tasks that only contain topological structures, the classification system based on node feature similarity is completely unavailable. On the other hand, if the low-order characteristics of the graph data are used to clean the adversarial examples, then it may introduce new perturbations and cause secondary contamination to the data, and the performance of the model under lower perturbation rates cannot be guaranteed as a result. (2) The existing trusted graph data classification system and the adversarial training technique (the second existing technique, the fourth existing technique and the fifth existing technique) need to know the technical details of the adversarial examples in advance, or need to generate a large number of adversarial examples for targeted improvement in robustness. This process will waste a considerable amount of time in the data construction stage due to the high complexity of their adversarial example generation algorithms. Moreover, this targeted improvement cannot defend against unknown perturbations effectively. (3) The third existing technique is based on a probability theory model, in which the GNN produces a certain defense against attacks from a high proportion of adversarial examples. In an environment with a low perturbation rate, however, the classification system has an unstable performance, which is even inferior to that of a typical GNN classification system.

The above analysis has identified the problems and shortcomings in the prior art as follows.

(1) The existing data cleaning techniques use node feature similarity or low-order characteristics of graph data, which causes the following two problems. On one hand, for some graph data analysis tasks that only contain topological structures, the classification system based on node feature similarity is completely unavailable. On the other hand, if the low-order characteristics of the graph data are used to clean the adversarial examples, then it may introduce new perturbations and cause secondary contamination to the data, and the performance of the model under lower perturbation rates cannot be guaranteed as a result.

(2) The existing trusted graph data classification system and the adversarial training technique will waste a considerable amount of time in the data construction stage due to the high complexity of their adversarial example generation algorithms. Moreover, this targeted improvement cannot defend against unknown perturbations effectively.

(3) In the technique based on a probability theory model, the GNN produces a certain defense against attacks from a high proportion of adversarial examples. In an environment with a low perturbation rate, however, the classification system has an unstable performance, which is even inferior to that of a typical GNN classification system.

The difficulty of solving the above-mentioned problems and shortcomings is: how to improve the robustness of the system without knowing the technical details of adversarial examples; how to shorten the processing time in the data preparation stage to improve the efficiency of the system; how to improve the applicability of the system to avoid excessive reliance on a certain feature of the graph data; and how to enable the system to maintain a high accuracy at a relatively low perturbation rate close to that of the real environment or on data without adversarial examples, while ensuring its robustness.

The significance of solving the above-mentioned problems and shortcomings is: to improve the robustness and security of the classification system, and to accelerate the promotion and application of graph neural networks in the industrial field, especially in some areas that require high security. Additionally, it can improve the stability and reliability of existing applications, and make full use of the powerful expressiveness of graph neural networks to promote production progress. Furthermore, it can improve the applicability of the system and reduce the application limitations of graph neural networks, which is conducive to exploring the application potential of graph neural networks and expanding the application range of graph neural networks.

SUMMARY

In view of the problems identified in the prior art, the present invention provides a trusted graph data node classification method, system, computer device and application.

The present invention is achieved by providing a trusted graph data node classification method, including:

inputting an adjacency matrix and a node feature matrix of a graph, and calculating a discrete Ricci curvature of the discrete topological graph to extract topological information; compared with feature similarity, the attention mechanism and other mechanisms, the discrete Ricci curvature can more clearly distinguish adversarial examples; since a curvature model does not rely on features, a curvature-driven network is capable of running on some graph data without features, and thus has a wider range of applications;

preprocessing of the curvature and node features: preprocessing an original curvature and normalizing the node feature matrix for subsequent reconstruction and aggregation of features, and reconstructing the features by using a residual network to reduce the over-smoothing problem in a model sub-fitting process;

mapping and normalizing the curvature by using a multilayer perceptron (MLP), reconstructing original features by using a feature reconstruction model, performing a semi-supervised training by using the mapped curvature matrix and an original feature vector, and extracting and aggregating the node features; and performing a classification prediction on nodes in graph data by using a node classification model.

Further, according to the trusted graph data node classification method, the discrete Ricci curvature is calculated specifically by the following Ricci-Ollivier curvature calculation formula:

$$k_{xy} = 1 - \frac{W(m_x, m_y)}{d(x, y)};$$

wherein x and y represent the nodes in the topological graph, $k_{xy}$ represents an edge $e(x, y)$ between the node x and the node y, $W(m_x, m_y)$ represents a Wasserstein distance, and $d(x, y)$ represents a shortest distance between the node x and the node y, that is, a weight of the edge $e(x, y)$; and $$m_x^\alpha(x_i) \begin{cases} \alpha & x_i = x \\ (1-\alpha)/k & x \in N(x) \\ 0 & x \notin N(x), x_i \neq x \end{cases};$$

wherein $\alpha$ represents a hyperparameter and $\alpha \in [0,1]$, $\alpha$ is generally set to 0.5; $m_x^\alpha(x_i)$ represents a probability measure at the node x; and if $G=(V, E)$ represents a set of vertices and edges in an undirected graph, then for each node $x \in V$, $N(x)=\{x_1, x_2, x_4, \ldots, x_k\}$ represents first-order neighboring nodes of the node x;

the Wasserstein distance between the node x and the node y is calculated by solving the following linear programs:

$$\min \Sigma_{i,j} d(x_i, y_i) M(x_i, y_i);$$

$$\text{s.t.} \Sigma_j M(x_i, y_i) = m_x^\alpha(x_i), \forall_i;$$

$$\Sigma_i M(x_i, y_i) = m_x^\alpha(y_i), \forall_j.$$

Further, according to the trusted graph data node classification method, the preprocessing of the curvature specifically includes: preprocessing a curvature with a relatively low value according to the following calculation formula:

$$\begin{cases} t = \text{percentile } (K, p) \\ \widetilde{k_{xy}} = \begin{cases} k_{xy} k_{xy} \geq t \\ -1 k_{xy} < t \end{cases} \end{cases};$$

wherein p is a hyperparameter and represents a percentage, and percentile(K, p) represents calculating a $p^{th}$ value in all curvature values sorted in ascending order.

Further, according to the trusted graph data node classification method, the original feature matrix is normalized by calculating a sum of feature vectors of each row and dividing each eigenvalue by the sum, so that the sum of eigenvalues of all feature vectors in the processed feature matrix is 1; and based on a node feature reconstruction module with a residual network, feature vectors of the first-order neighboring nodes $x_i \in N(x)$ of each node feature $x \in \mathbb{R}^f$ are extracted from the feature matrix, the feature vectors are vertically stacked into a new matrix M, the node x is vertically stacked into a same matrix, these matrices are concatenated to obtain a matrix $\tilde{M} \in \mathbb{R}^{f \times f}$, a Mask of the stacked matrix is calculated by using the MLP, and the reconstructed feature matrix is $\tilde{X}$, wherein each feature vector $\tilde{x}_i$ is aggregated as:

$$\tilde{x}_i = x_i + \text{sum}(\text{Mask} \times M, \text{axis}=1)$$

wherein the sum function represents calculating the sum of matrices column-wise.

Further, a curvature mapping module for the trusted graph data node classification method is the MLP with a bias of 1, uses a leaky rectifier linear unit (LeakyRelu) activation function with $\alpha=0.2$, and normalizes a final curvature matrix row-wise to obtain the mapped curvature matrix $\psi$;

a curvature aggregation module is a curvature-based hidden layer node feature aggregation module, replaces a Laplacian matrix in a traditional graph convolutional network (GCN) by a mapped curvature value, and uses an inter-layer aggregation formula as follows:

$$H_x^{l+1}=\sigma_l(\Sigma_{y\in N(x)}\mathrm{diag}(\psi_{xy}^l)W^l H_y^l); \text{ and}$$

network parameters of each module in the graph neural network (GNN) model are updated synchronously by using a backpropagation algorithm during the semi-supervised learning and training process.

Further, a node prediction model for the trusted graph data node classification method uses a node feature vector output from the last layer of the network to pass through a fully-connected layer network, uses softmax as an activation function to obtain a probability distribution of the nodes, and takes a class with a largest predicted probability as a predicted result of the nodes.

Another objective of the present invention is to provide a computer device, including a memory and a processor, wherein a computer program is stored in the memory, and when the computer program is executed by the processor, the processor executes the following steps:

inputting an adjacency matrix and a node feature matrix of a graph, and calculating a discrete Ricci curvature of the discrete topological graph to extract topological information;

preprocessing of the curvature and node features: preprocessing an original curvature and normalizing the node feature matrix;

mapping and normalizing the curvature by using an MLP, reconstructing original features by using a feature reconstruction model, performing a semi-supervised training by using the mapped curvature matrix and an original feature vector, and extracting and aggregating the node features; and performing a classification prediction on nodes in graph data by using a node classification model.

Another objective of the present invention is to provide a computer-readable storage medium, wherein a computer program is stored in the computer-readable storage medium, and when the computer program is executed by a processor, the processor executes the following steps:

inputting an adjacency matrix and a node feature matrix of a graph, and calculating a discrete Ricci curvature of the discrete topological graph to extract topological information;

preprocessing of the curvature and node features: preprocessing an original curvature and normalizing the node feature matrix;

mapping and normalizing the curvature by using an MLP, reconstructing original features by using a feature reconstruction model, performing a semi-supervised training by using the mapped curvature matrix and an original feature vector, and extracting and aggregating the node features; and performing a classification prediction on nodes in graph data by using a node classification model.

Another objective of the present invention is to provide a trusted graph data node classification system for implementing the trusted graph data node classification method, and the trusted graph data node classification system includes:

a topological information extraction module, configured for inputting a topological graph and node features, and calculating a discrete Ricci curvature of the discrete topological graph to extract topological information;

a normalization preprocessing module, configured for performing a normalization preprocessing on the curvature and node features;

a semi-supervised training module, configured for performing a semi-supervised training on graph data containing adversarial examples by using the curvature and a residual network model; and a classification prediction module, configured for performing a classification prediction on unlabeled nodes.

Another objective of the present invention is to provide a computer hardware device for implementing the trusted graph data node classification method.

With a combination of all the above technical solutions, the present invention has the following advantages. The present invention does not need to know the technical details of the adversarial examples, does not need to clean the original topology, and does not require a large number of adversarial examples for adversarial training. In this way, the system has strong applicability and high accuracy.

TABLE 1

Comparison between experimental results

| Data set\Comparative scheme | PtbEdge | GCN | GCNJaccard | GCNSVD | RGCN | CURV_GN | GAT | ProGNN | Our_Model |
|---|---|---|---|---|---|---|---|---|---|
| Cora | 1 | 77.78 ± 0.62 | 77.85 ± 0.88 | 76.18 ± 0.44 | 75.63 ± 0.71 | 76.81 ± 0.75 | 74.72 ± 1.84 | 78.06 ± 0.71 | 81.25 ± 0.89 |
| | 2 | 65.76 ± 1.06 | 68.54 ± 0.62 | 67.43 ± 1.14 | 64.51 ± 1.26 | 63.19 ± 2.44 | 64.79 ± 2.32 | 66.67 ± 0.99 | 75.42 ± 1.33 |
| | 3 | 53.82 ± 0.70 | 65.35 ± 1.00 | 60.90 ± 1.35 | 52.22 ± 0.86 | 55.21 ± 2.91 | 53.68 ± 2.45 | 54.10 ± 0.74 | 69.58 ± 2.37 |
| | 4 | 42.78 ± 1.33 | 58.54 ± 1.70 | 49.44 ± 1.15 | 40.83 ± 1.50 | 42.29 ± 4.91 | 44.44 ± 2.34 | 43.82 ± 1.98 | 61.25 ± 1.04 |
| | 5 | 32.99 ± 1.62 | 48.96 ± 1.42 | 41.94 ± 0.46 | 31.32 ± 1.16 | 36.39 ± 4.61 | 30.97 ± 1.84 | 31.74 ± 0.44 | 52.50 ± 1.64 |
| Cora_ml | 1 | 74.43 ± 0.44 | 75.29 ± 1.02 | 74.47 ± 0.59 | 73.65 ± 0.70 | 73.98 ± 0.89 | 76.55 ± 0.99 | 78.39 ± 0.65 | 80.64 ± 0.26 |
| | 2 | 64.42 ± 1.40 | 66.50 ± 0.56 | 69.20 ± 1.03 | 62.09 ± 0.87 | 63.85 ± 0.95 | 65.85 ± 1.43 | 68.30 ± 0.66 | 73.28 ± 0.50 |
| | 3 | 55.31 ± 1.30 | 57.03 ± 0.64 | 60.83 ± 0.77 | 50.20 ± 1.48 | 50.12 ± 3.95 | 55.19 ± 2.21 | 56.41 ± 1.03 | 65.20 ± 0.88 |
| | 4 | 42.40 ± 2.14 | 45.06 ± 1.07 | 52.21 ± 1.62 | 37.17 ± 1.95 | 36.81 ± 4.70 | 40.07 ± 2.24 | 41.91 ± 1.22 | 59.31 ± 1.68 |
| | 5 | 30.31 ± 2.24 | 34.84 ± 0.99 | 41.46 ± 2.42 | 26.92 ± 1.96 | 25.94 ± 3.00 | 29.17 ± 1.45 | 29.17 ± 1.53 | 46.81 ± 1.41 |

TABLE 1-continued

Comparison between experimental results

| Data set\Comparative scheme | PtbEdge | GCN | GCNJaccard | GCNSVD | RGCN | CURV_GN | GAT | ProGNN | Our_Model |
|---|---|---|---|---|---|---|---|---|---|
| Citeseer | 1 | 62.07 ± 0.58 | 63.69 ± 1.44 | 68.02 ± 1.10 | 56.40 ± 1.92 | 63.51 ± 1.07 | 63.06 ± 3.39 | 63.06 ± 1.78 | 70.81 ± 1.15 |
|  | 2 | 54.14 ± 1.14 | 59.37 ± 1.48 | 56.13 ± 1.34 | 49.37 ± 1.11 | 49.91 ± 1.49 | 54.32 ± 2.47 | 55.86 ± 1.70 | 64.86 ± 1.49 |
|  | 3 | 47.57 ± 1.36 | 51.53 ± 0.74 | 43.42 ± 0.74 | 41.89 ± 1.46 | 40.18 ± 2.68 | 40.99 ± 4.64 | 45.59 ± 0.97 | 56.76 ± 1.21 |
|  | 4 | 37.39 ± 1.41 | 44.05 ± 1.97 | 36.40 ± 1.94 | 29.19 ± 0.99 | 29.01 ± 3.69 | 30.18 ± 1.80 | 33.24 ± 1.64 | 45.95 ± 0.85 |
|  | 5 | 26.76 ± 1.02 | 37.84 ± 2.09 | 28.56 ± 1.05 | 21.44 ± 1.70 | 23.24 ± 4.91 | 22.61 ± 4.07 | 22.25 ± 1.38 | 40.54 ± 1.30 |
| Polblogs | 1 | 87.55 ± 1.93 | / | 93.54 ± 0.76 | 90.14 ± 0.96 | 90.99 ± 8.13 | 95.92 ± 1.18 | 96.09 ± 0.92 | 97.96 ± 0.51 |
|  | 2 | 77.65 ± 1.40 | / | 91.67 ± 1.09 | 77.89 ± 1.40 | 75.51 ± 13.38 | 94.56 ± 3.32 | 94.22 ± 0.76 | 95.92 ± 0.00 |
|  | 3 | 58.16 ± 1.88 | / | 91.33 ± 1.64 | 56.46 ± 0.48 | 64.97 ± 15.69 | 92.18 ± 2.33 | 88.27 ± 0.98 | 95.92 ± 0.59 |
|  | 4 | 52.35 ± 5.46 | / | 85.54 ± 3.51 | 43.03 ± 2.39 | 62.24 ± 7.88 | 91.33 ± 0.78 | 81.80 ± 1.90 | 93.88 ± 1.44 |
|  | 5 | 41.22 ± 6.13 | / | 72.45 ± 2.12 | 28.74 ± 1.60 | 57.48 ± 16.23 | 81.63 ± 11.42 | 74.49 ± 1.56 | 94.90 ± 1.09 |

In the present invention, the Laplacian matrix in the convolutional graph neural network is replaced by the mapped curvature matrix. The importance of each feature is learned by using the MLP. The features are reconstructed on the original feature matrix. In this way, the node features and topological information of the graph data are fully utilized to improve the robustness of the model while avoiding secondary contamination caused by cleaning the original topological information. This multi-dimensional aggregation method effectively improves the adaptability and accuracy of the system. The above Table shows the experimental results of using the adversarial example generation model Nettack on four data sets, and compared with seven mainstream schemes, the accuracy of the system of the present invention is higher than that of each of these schemes.

When used in graph data without adversarial examples, the system of the present invention achieves an average accuracy that is 1.33% to 5.41% higher than those of other approaches. When used in graph data containing adversarial examples, the system significantly outperforms other approaches in terms of accuracy.

BRIEF DESCRIPTION OF THE DRAWINGS

In order to explain the technical solutions of the embodiments of the present invention more clearly, the drawings used in the embodiments of the present invention will be briefly introduced below. Obviously, the drawings described below are only some embodiments of the present invention. For those of ordinary skill in the art, other drawings can be obtained based on these drawings without creative efforts.

In FIG. 2: 1 represents topological information extraction module; 2 represents normalization preprocessing module; 3 represents semi-supervised training module; and 4 represents classification prediction module.

DETAILED DESCRIPTION OF THE EMBODIMENTS

In order to make the objectives, technical solutions, and advantages of the present invention clearer, the present invention will be further described in detail below in conjunction with embodiments. It should be understood that the specific embodiments described herein are only used to explain the present invention, rather than to limit the present invention.

In view of the problems identified in the prior art, the present invention provides a trusted graph data node classification method, system, computer device and application. The present invention will be described in detail below with reference to the drawings.

Figure 1:
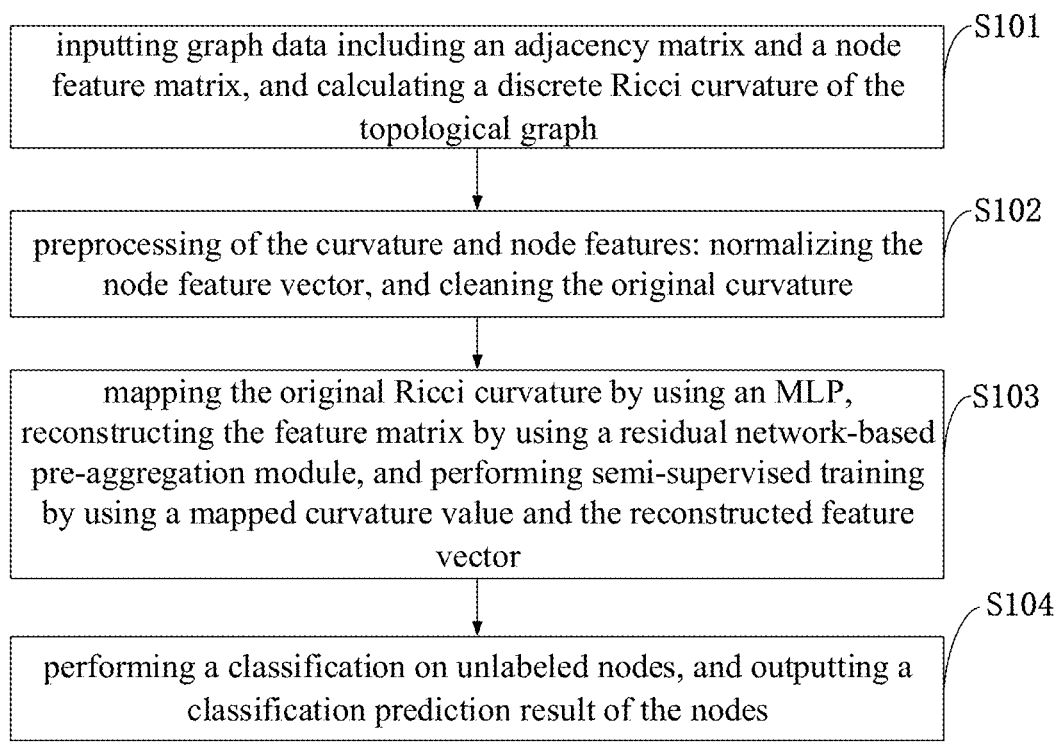
FIG. 1 is a flow chart of a trusted graph data node classification method according to an embodiment of the present invention.

As shown in FIG. 1, the trusted graph data node classification method includes the following steps:

S101: an adjacency matrix and a node feature matrix of a graph are input, and a discrete Ricci curvature of the discrete topological graph is calculated to extract topological information;

S102: preprocessing of the curvature and node features: the original curvature is preprocessed and the node feature matrix is normalized;

S103: the curvature is mapped and normalized by using an MLP, original features are reconstructed by using a feature reconstruction model, semi-supervised training is performed by using the mapped curvature matrix and an original feature vector, and the node features are extracted and aggregated; and S104: a classification prediction is performed on nodes in the graph data by using a node classification model.

Those of ordinary skill in the art can also implement the trusted graph data node classification method of the present invention by using other steps. FIG. 1 only illustrates a specific embodiment of the trusted graph data node classification method of the present invention.

Figure 2:
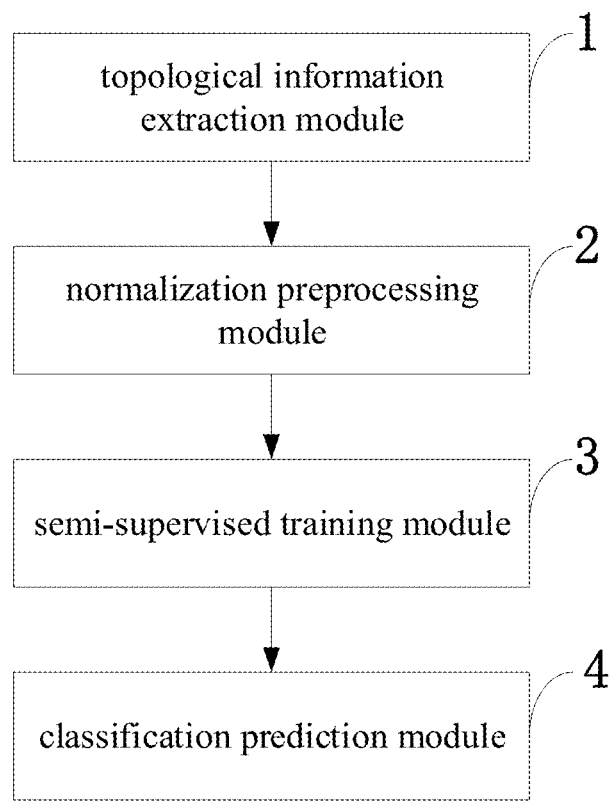
FIG. 2 is a structural schematic diagram of a trusted graph data node classification system according to an embodiment of the present invention.

As shown in FIG. 2, a trusted graph data node classification system according to the present invention includes:
- the topological information extraction module 1, configured for inputting a topological graph and node features, and calculating a discrete Ricci curvature of the discrete topological graph to extract topological information;
- the normalization preprocessing module 2, configured for performing a normalization preprocessing on the curvature and node features;
- the semi-supervised training module 3, configured for performing a semi-supervised training on graph data containing adversarial examples by using the curvature and a residual network model; and
- the classification prediction module 4, configured for performing a classification prediction on unlabeled nodes.

The technical solution of the present invention will be further described below in conjunction with the drawings.

Figure 3:
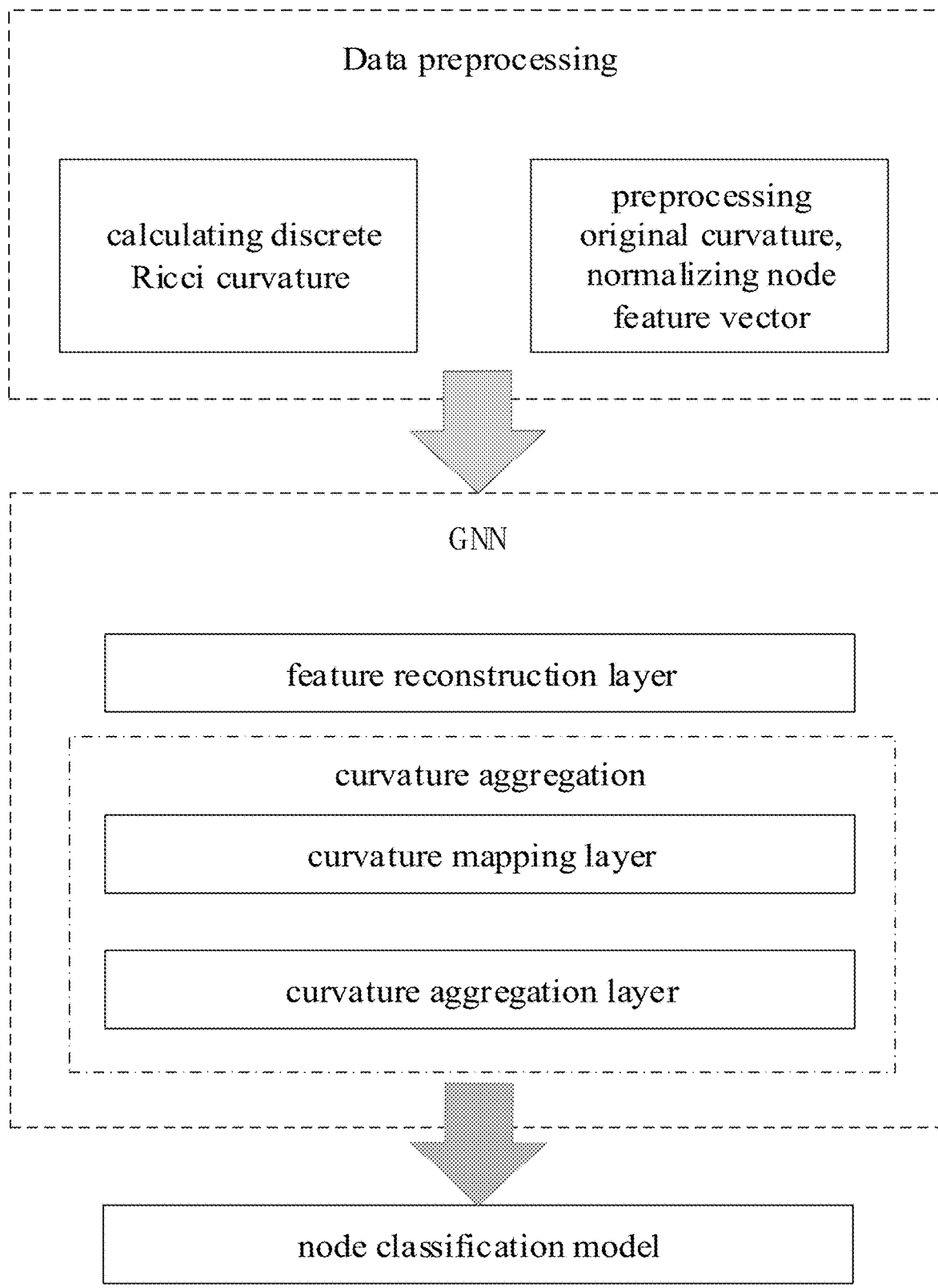
FIG. 3 is a schematic diagram of the structure of each module and the overall system of the trusted graph data node classification method according to an embodiment of the present invention.

As shown in FIG. 3, in the present invention, a discrete curvature is introduced into the graph neural network, and the original features are reconstructed. In this way, the topological information of the graph data and the original features of the nodes are fully and reasonably utilized, thereby improving the applicability and stability of the classification model.

The discrete Ricci curvature is calculated specifically by the following Ricci-Ollivier curvature calculation formula:

$$k_{xy} = 1 - \frac{W(m_x, m_y)}{d(x, y)};$$

wherein x and y represent the nodes in the topological graph, $k_{xy}$ represents an edge e(x, y) between the node x and the node y, $W(m_x, m_y)$ represents a Wasserstein distance, and d(x, y) represents a shortest distance between the node x and the node y, that is, a weight of the edge e(x, y); and $$m_x^\alpha(x_i) \begin{cases} \alpha & x_i = x \\ (1-\alpha)/k & x \in N(x) \\ 0 & x \notin N(x), x_i \neq x \end{cases};$$

wherein α represents a hyperparameter and α∈[0,1], α is generally set to 0.5; $m_x^\alpha(x_i)$ represents a probability measure at the node x; and if G=(V, E) represents a set of vertices and edges in an undirected graph, then for each node x∈V, $N(x)=\{x_1, x_2, x_4, \ldots, x_k\}$ represents first-order neighboring nodes of the node x.

The Wasserstein distance between the node x and the node y is calculated by solving the following linear programs:

$$\min \Sigma_{i,j} d(x_i, y_j) M(x_i, y_j);$$

$$s.t. \Sigma_j M(x_i, y_j) = m_x^\alpha(x_i), \forall_i;$$

$$\Sigma_i M(x_i, y_j) = m_x^\alpha(y_j), \forall_j.$$

The preprocessing of the curvature specifically includes: preprocessing some curvatures with relatively low values to reduce the influence of adversarial examples according to the following calculation formula:

$$\begin{cases} t = \text{percentile }(K, p) \\ \widetilde{k_{xy}} = \begin{cases} k_{xy} k_{xy} \geq t \\ -1 k_{xy} < t \end{cases} \end{cases};$$

wherein p is a hyperparameter and represents a percentage, and percentile(K, p) represents calculating a $p^{th}$ value in all curvature values sorted in ascending order.

The original feature matrix is normalized specifically by calculating a sum of feature vectors of each row and dividing each eigenvalue by the sum, so that the sum of eigenvalues of all feature vectors in the processed feature matrix is 1.

Specifically, based on a node feature reconstruction module with a residual network, feature vectors of the first-order neighboring nodes $x_i \in N(x)$ of each node feature $x \in \mathbb{R}^f$ are extracted from the feature matrix, the feature vectors are vertically stacked into a new matrix M, the node x is also vertically stacked into a same matrix, and these matrices are concatenated to obtain a matrix $\tilde{M} \in \mathbb{R}^{f \times f}$. A Mask of the stacked matrix is calculated by using the MLP, and the reconstructed feature matrix is $\tilde{X}$, wherein each feature vector $\tilde{x}_i$ is aggregated as:

$$\tilde{x}_i = x_i + \text{sum}(\text{Mask} \times M, \text{axis}=1)$$

wherein the sum function represents calculating the sum of matrices column-wise.

The curvature mapping module is the MLP with a bias of 1, uses a leaky rectifier linear unit (LeakyRelu) activation function with α=0.2, and normalizes a final curvature matrix row-wise to obtain the mapped curvature matrix ψ.

The curvature aggregation module is a curvature-based hidden layer node feature aggregation module, replaces a Laplacian matrix in a traditional GCN by a mapped curvature value, and uses an inter-layer aggregation formula as follows:

$$H_x^{l+1} = \sigma_l(\Sigma_{y \in N(x)} \text{diag}(\psi_{xy}^l) W^l H_y^l).$$

Network parameters of each module in the GNN model are updated synchronously by using a backpropagation algorithm during the semi-supervised learning and training process.

The node prediction model uses a node feature vector output from the last layer of the network to pass through a fully-connected layer network, uses softmax as an activation function to obtain a probability distribution of the nodes, and takes a class with a largest predicted probability as a predicted result of the nodes.

The technical effects of the present invention will be described in detail below in conjunction with an experiment.

Figure 4:
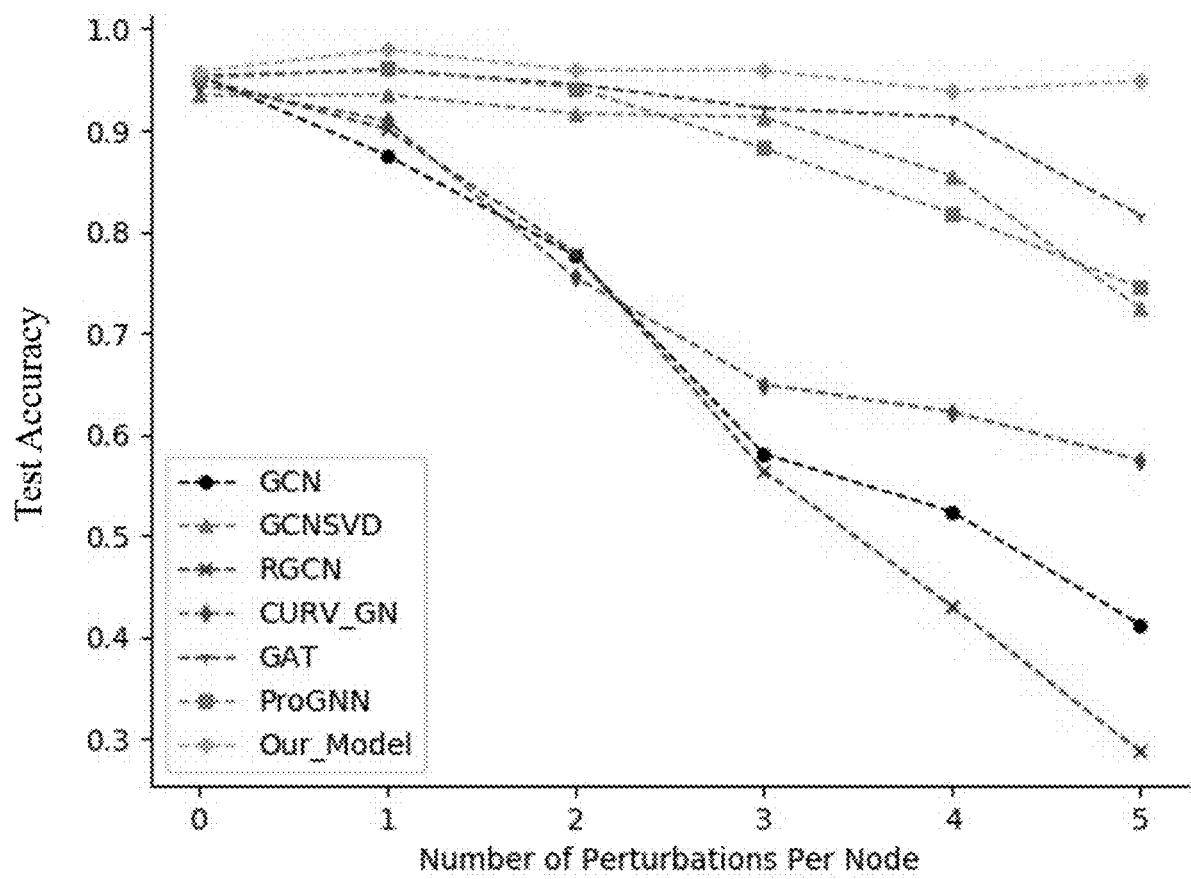
FIG. 4 is a graph showing the experimental results according to an embodiment of the present invention.

As shown in FIG. 4, the experiment implements the model through the well-known open-source deep learning platform Pytorch and its derived graph neural network framework Torch_geometric, the curvature calculation-associated open-source library GraphRicciCurvature, and the network analysis open-source library networkx, and is based on the hardware platform NVIDIARTX2080. Four real data sets Cora, Citeseer, Polblogs, Pumbed and four mainstream adversarial example generation models are used to validate and evaluate the performance of the model and existing methods. The data sets and the existing methods are evaluated by using the accuracy of the model as an evaluation indicator. During the semi-supervised training, the proportion of the training set to the validation set to the test set is 0.1:0.1:0.8, and the number of training iterations for all methods is 200.

The result of using the targeted attack adversarial example generation model Nettack to perform a perturbation test on the data shows that when used in the data containing adversarial examples with different degrees, the model achieves an accuracy that is at least 1.87%-20.41% higher than those of the existing methods, and especially when used in the data set Polblogs, the model maintains an accuracy of more than 90% at the highest perturbation rate.

The result of using the non-targeted attack adversarial example generation model Mettack and Dice to perform a perturbation test on the data shows that when the entire data set contains 5%, 10%, 15%, 20%, 25%, and 30% of adversarial examples, the accuracy of the model is improved by at least 2.98%, 7.64%, 13.71%, 17.86%, and 23.27%, respectively, compared with the existing methods.

The result of using the non-targeted attack random adversarial example generation model Random to perform a perturbation test on the data shows that when the entire data set contains 5%, 10%, 15%, 20%, 25%, and 30% of adversarial examples, the accuracy of the model is improved by at least 1.45%, 3.66%, 5.77%, 8.45%, and 9.91%, respectively, compared with the existing methods.

It should be noted that the embodiments of the present invention can be implemented by hardware, software, or a combination of software and hardware. The hardware part can be implemented by dedicated logic. The software part can be stored in a memory, and the system can be executed by appropriate instructions, for example, the system can be executed by a microprocessor or dedicated hardware. Those of ordinary skill in the art can understand that the above-mentioned devices and methods can be implemented by using computer-executable instructions and/or control codes included in a processor. Such codes are provided, for example, on a carrier medium such as a magnetic disk, compact disc (CD) or digital video disk read-only memory (DVD-ROM), a programmable memory such as a read-only memory (firmware), or a data carrier such as an optical or electronic signal carrier. The device and its modules of the present invention can be implemented by very large-scale integrated circuits or gate arrays, semiconductors such as logic chips and transistors, or programmable hardware devices such as field programmable gate arrays and programmable logic devices, and other hardware circuits. Optionally, the device and its modules of the present invention can be implemented by software executed by various types of processors, or can be implemented by a combination of the hardware circuit and the software as mentioned above, such as firmware.

The above only describes the specific embodiments of the present invention, but the scope of protection of the present invention is not limited thereto. Any modifications, equivalent replacements, improvements and others made by any person skilled in the art within the technical scope disclosed in the present invention and the spirit and principle of the present invention shall fall within the scope of protection of the present invention.

What is claimed is:

1. A trusted graph data node classification method, comprising:
inputting an adjacency matrix and a node feature matrix of a discrete topological graph, and calculating a discrete Ricci curvature of the discrete topological graph to extract topological information;
preprocessing of the discrete Ricci curvature and node features: preprocessing the discrete Ricci curvature and normalizing the node feature matrix;
mapping and normalizing the discrete Ricci curvature by using a multilayer perceptron (MLP) to obtain a mapped curvature matrix, reconstructing original features by using a feature reconstruction model to obtain a reconstructed feature matrix, performing a semi-supervised training by using the mapped curvature matrix and an original feature vector, and extracting and aggregating the node features; and
performing a classification prediction on nodes in the discrete topological graph by using a node classification model.

2. The trusted graph data node classification method according to claim 1, wherein
the discrete Ricci curvature is calculated specifically by the following Ricci-Ollivier curvature calculation formula:

$$k_{xy} = 1 - \frac{W(m_x, m_y)}{d(x, y)};$$

wherein x and y represent a node x and a node y of the nodes in the topological graph, $k_{xy}$ represents an edge e(x, y) between the node x and the node y, $W(m_x, m_y)$ represents a Wasserstein distance, and d(x, y) represents a shortest distance between the node x and the node y, wherein the shortest distance between the node x and the node y is given by a weight of the edge e(x, y); and $$m_x^\alpha(x_i) \begin{cases} \alpha & x_i = x \\ (1-\alpha)/k & x \in N(x) \\ 0 & x \notin N(x), x_i \neq x \end{cases};$$

wherein $\alpha$ represents a hyperparameter and $\alpha \in [0,1]$, $\alpha$ is set to 0.5; $m_x^\alpha(x_i)$ represents a probability measure at the node x; and if G=(V, E) represents a set of vertices and edges in an undirected graph, then for the node x∈V, $N(x)=\{x_1, x_2, x_4, \ldots, x_k\}$ represents first-order neighboring nodes of the node x;
the Wasserstein distance between the node x and the node y is calculated by solving the following linear programs:

$$\min \Sigma_{i,j} d(x_i, y_i) M(x_i, y_i);$$

$$\text{s.t.} \Sigma_j M(x_i, y_i) = m_x^\alpha(x_i), \forall i;$$

$$\Sigma_i M(x_i, y_i) = m_x^\alpha(y_i), \forall j.$$

3. The trusted graph data node classification method according to claim 1, wherein
the preprocessing of the discrete Ricci curvature specifically comprises:
preprocessing the discrete Ricci curvature with a predetermined value according to the following calculation formula:

$$\begin{cases} t = \text{percentile}(K, p) \\ \bar{k}_{xy} = \begin{cases} k_{xy} & k_{xy} \geq t \\ -1 k_{xy} & k_{xy} < t \end{cases} \end{cases};$$

wherein p is a hyperparameter and represents a percentage, and percentile(K,p) represents calculating a $p^{th}$ value in a plurality of curvature values sorted in ascending order.

4. The trusted graph data node classification method according to claim 1, wherein the node feature matrix is normalized by calculating a sum of feature vectors of each row and dividing each eigenvalue by the sum to obtain a processed feature matrix, and a sum of eigenvalues of feature vectors in the processed feature matrix is 1; and based on a node feature reconstruction module with a residual network, feature vectors of first-order neighboring nodes $x_i \in N(x)$ of each node feature $x \in \mathbb{R}^f$ are extracted from the processed feature matrix, the feature vectors of the first-order neighboring nodes $x_i \in N(x)$ are vertically stacked into a first matrix M, the node x is vertically stacked into a second matrix, the first matrix M and the second matrix are concatenated to obtain a stacked matrix $\tilde{M} \in \mathbb{R}^{f \times f}$, a Mask of the stacked matrix $\tilde{M} \in \mathbb{R}^{f \times f}$ is calculated by using the MLP, and the reconstructed feature matrix is $\tilde{X}$, wherein each feature vector $\tilde{x}_i$ in the reconstructed feature matrix is $\tilde{X}$ is aggregated as:

$$\tilde{x}_i = x_i + \text{sum}(\text{Mask} \times M, \text{axis}=1);$$

wherein a sum function represents calculating a sum of matrices column-wise.

5. The trusted graph data node classification method according to claim 1, wherein a curvature mapping module for the trusted graph data node classification method is the MLP with a bias of 1, the curvature mapping module uses a leaky rectifier linear unit (LeakyRelu) activation function with $\alpha=0.2$, and the curvature mapping module normalizes a final curvature matrix row-wise to obtain the mapped curvature matrix $\psi$;

a curvature aggregation module for the trusted graph data node classification method is a curvature-based hidden layer node feature aggregation module, the curvature aggregation module replaces a Laplacian matrix in a traditional graph convolutional network (GCN) by a mapped curvature value, and the curvature aggregation module uses an inter-layer aggregation formula as follows:

$$H_x^{l+1} = \sigma_l(\Sigma_{y \in \overline{N(x)}} \text{diag}(\psi_{xy}^l) W^l H_y^l); \text{ and}$$

network parameters of each module in a graph neural network (GNN) model are updated synchronously by using a backpropagation algorithm during a semi-supervised learning and training process.

6. The trusted graph data node classification method according to claim 1, wherein a node prediction model for the trusted graph data node classification method uses a node feature vector output from a last layer of a GNN to pass through a fully-connected layer network, the node prediction model uses softmax as an activation function to obtain a probability distribution of the nodes, and the node prediction model takes a class with a largest predicted probability as a predicted result of the nodes.

7. A computer device, comprising
a memory and a processor;
wherein
a computer program is stored in the memory, and when the computer program is executed by the processor, the processor executes the following steps:

inputting an adjacency matrix and a node feature matrix of a discrete topological graph, and calculating a discrete Ricci curvature of the discrete topological graph to extract topological information;

preprocessing of the discrete Ricci curvature and node features: preprocessing the discrete Ricci curvature and normalizing the node feature matrix;

mapping and normalizing the discrete Ricci curvature by using an MLP to obtain a mapped curvature matrix, reconstructing original features by using a feature reconstruction model, performing a semi-supervised training by using the mapped curvature matrix and an original feature vector, and extracting and aggregating the node features; and performing a classification prediction on nodes in the discrete topological graph by using a node classification model.

8. A computer-readable storage medium, wherein a computer program is stored in the computer-readable storage medium, and when the computer program is executed by a processor, the processor executes the following steps:

inputting an adjacency matrix and a node feature matrix of a discrete topological graph, and calculating a discrete Ricci curvature of the discrete topological graph to extract topological information;

preprocessing of the discrete Ricci curvature and node features: preprocessing the discrete Ricci curvature and normalizing the node feature matrix;

mapping and normalizing the discrete Ricci curvature by using an MLP to obtain a mapped curvature matrix, reconstructing original features by using a feature reconstruction model, performing a semi-supervised training by using the mapped curvature matrix and an original feature vector, and extracting and aggregating the node features; and performing a classification prediction on nodes in the discrete topological graph by using a node classification model.

9. A trusted graph data node classification system for implementing the trusted graph data node classification method according to claim 1, comprising:

a topological information extraction module, configured for inputting the discrete topological graph and the node features, and calculating the discrete Ricci curvature of the discrete topological graph to extract the topological information;

a normalization preprocessing module, configured for performing a normalization preprocessing on the discrete Ricci curvature and the node features;

a semi-supervised training module, configured for performing the semi-supervised training on the discrete topological graph containing adversarial examples by using the discrete Ricci curvature and a residual network model; and a classification prediction module, configured for performing a classification prediction on unlabeled nodes.

10. A computer hardware device for implementing the trusted graph data node classification method according to claim 1.

11. The trusted graph data node classification system according to claim 9, wherein the discrete Ricci curvature is calculated specifically by the following Ricci-Ollivier curvature calculation formula:

$$k_{xy} = 1 - \frac{W(m_x, m_y)}{d(x, y)};$$

wherein x and y represent a node x and a node y of the nodes in the topological graph, $k_{xy}$ represents an edge e(x, y) between the node x and the node y, $W(m_x, m_y)$ represents a Wasserstein distance, and d(x, y) represents a shortest distance between the node x and the node y, wherein the shortest distance between the node x and the node y is given by a weight of the edge e(x, y); and $$m_x^\alpha(x_i) \begin{cases} \alpha & x_i = x \\ (1-\alpha)/k & x \in N(x) \\ 0 & x \notin N(x), x_i \neq x \end{cases};$$

wherein α represents a hyperparameter and α∈[0,1], α is set to 0.5; $m_x^\alpha(x_i)$ represents a probability measure at the node x; and if G=(V, E) represents a set of vertices and edges in an undirected graph, then for the node x∈V, N(x)={$x_1, x_2, x_4, \ldots, x_k$} represents first-order neighboring nodes of the node x;

the Wasserstein distance between the node x and the node y is calculated by solving the following linear programs:

min $\Sigma_{i,j} d(x_i, y_i) M(x_i, y_i)$;

s.t. $\Sigma_j M(x_i, y_i) = m_x^\alpha(x_i), \forall_i$;

$\Sigma_i M(x_i, y_i) = m_x^\alpha(y_i), \forall_j$.

12. The trusted graph data node classification system according to claim 9, wherein the preprocessing of the discrete Ricci curvature specifically comprises:

preprocessing the discrete Ricci curvature with a predetermined value according to the following calculation formula:

$$\begin{cases} t = \text{percentile } (K, p) \\ \bar{k}_{xy} = \begin{cases} k_{xy} k_{xy} \geq t \\ -1 k_{xy} < t \end{cases} \end{cases};$$

wherein p is a hyperparameter and represents a percentage, and percentile(K,p) represents calculating a $p^{th}$ value in a plurality of curvature values sorted in ascending order.

13. The trusted graph data node classification system according to claim 9, wherein the node feature matrix is normalized by calculating a sum of feature vectors of each row and dividing each eigenvalue by the sum to obtain a processed feature matrix, and a sum of eigenvalues of feature vectors in the processed feature matrix is 1; and based on a node feature reconstruction module with a residual network, feature vectors of first-order neighboring nodes $x_i \in N(x)$ of each node feature $x \in \mathbb{R}^f$ are extracted from the processed feature matrix, the feature vectors of the first-order neighboring nodes $x_i \in N(x)$ are vertically stacked into a first matrix M, the node x is vertically stacked into a second matrix, the first matrix M and the second matrix are concatenated to obtain a stacked matrix $\tilde{M} \in \mathbb{R}^{f \times f}$, a Mask of the stacked matrix $\tilde{M} \in \mathbb{R}^{f \times f}$ is calculated by using the MLP, and the reconstructed feature matrix is $\tilde{X}$, wherein each feature vector $\tilde{x}_i$ in the reconstructed feature matrix is $\tilde{X}$ is aggregated as:

$\tilde{x}_i = x_i + \text{sum}(\text{Mask} \times M, \text{axis}=1)$;

wherein a sum function represents calculating a sum of matrices column-wise.

14. The trusted graph data node classification system according to claim 9, wherein a curvature mapping module for the trusted graph data node classification method is the MLP with a bias of 1, the curvature mapping module uses a leaky rectifier linear unit (LeakyRelu) activation function with α=0.2, and the curvature mapping module normalizes a final curvature matrix row-wise to obtain the mapped curvature matrix ψ;

a curvature aggregation module for the trusted graph data node classification method is a curvature-based hidden layer node feature aggregation module, the curvature aggregation module replaces a Laplacian matrix in a traditional graph convolutional network (GCN) by a mapped curvature value, and the curvature aggregation module uses an inter-layer aggregation formula as follows:

$H_x^{l+1} = \sigma_l(\Sigma_{y \in N(x)} \text{diag}(\psi_{xy}^l) W^l H_y^l)$; and network parameters of each module in a graph neural network (GNN) model are updated synchronously by using a backpropagation algorithm during a semi-supervised learning and training process.

15. The trusted graph data node classification system according to claim 9, wherein a node prediction model for the trusted graph data node classification method uses a node feature vector output from a last layer of a GNN to pass through a fully-connected layer network, the node prediction model uses softmax as an activation function to obtain a probability distribution of the nodes, and the node prediction model takes a class with a largest predicted probability as a predicted result of the nodes.

16. The computer hardware device according to claim 10, wherein the discrete Ricci curvature is calculated specifically by the following Ricci-Ollivier curvature calculation formula:

$$k_{xy} = 1 - \frac{W(m_x, m_y)}{d(x, y)};$$

wherein x and y represent a node x and a node y of the nodes in the topological graph, $k_{xy}$ represents an edge e(x, y) between the node x and the node y, $W(m_x, m_y)$ represents a Wasserstein distance, and d(x, y) represents a shortest distance between the node x and the node y, wherein the shortest distance between the node x and the node y is given by a weight of the edge e(x, y); and $$m_x^\alpha(x_i) \begin{cases} \alpha & x_i = x \\ (1-\alpha)/k & x \in N(x) \\ 0 & x \notin N(x), x_i \neq x \end{cases};$$

wherein α represents a hyperparameter and α∈[0,1], α is set to 0.5; $m_x^\alpha(x_i)$ represents a probability measure at the node x; and if G=(V, E) represents a set of vertices and edges in an undirected graph, then for the node x∈V, N(x)={$x_1, x_2, x_4, \ldots, x_k$} represents first-order neighboring nodes of the node x;

the Wasserstein distance between the node x and the node y is calculated by solving the following linear programs:

$$\min \Sigma_{i,j} d(x_i, y_i) M(x_i, y_i);$$

$$s.t. \Sigma_j M(x_i, y_i) = m_x^\alpha(x_i), \forall_i;$$

$$\Sigma_i M(x_i, y_i) = m_x^\alpha(y_i), \forall_j.$$

17. The computer hardware device according to claim 10, wherein
the preprocessing of the discrete Ricci curvature specifically comprises:
preprocessing the discrete Ricci curvature with a predetermined value according to the following calculation formula:

$$\begin{cases} t = \text{percentile}(K, p) \\ k_{xy}^- = \begin{cases} k_{xy} & k_{xy} \geq t \\ -1 & k_{xy} < t \end{cases} \end{cases} ;$$

wherein p is a hyperparameter and represents a percentage, and percentile(K, p) represents calculating a $p^{th}$ value in a plurality of curvature values sorted in ascending order.

18. The computer hardware device according to claim 10, wherein
the node feature matrix is normalized by calculating a sum of feature vectors of each row and dividing each eigenvalue by the sum to obtain a processed feature matrix, and a sum of eigenvalues of feature vectors in the processed feature matrix is 1; and
based on a node feature reconstruction module with a residual network, feature vectors of first-order neighboring nodes $x_i \in N(x)$ of each node feature $x \in \mathbb{R}^f$ are extracted from the processed feature matrix, the feature vectors of the first-order neighboring nodes $x_i \in N(x)$ are vertically stacked into a first matrix M, the node x is vertically stacked into a second matrix, the first matrix M and the second matrix are concatenated to obtain a stacked matrix $\tilde{M} \in \mathbb{R}^{f \times f}$, a Mask of the stacked matrix $\tilde{M} \in \mathbb{R}^{f \times f}$ is calculated by using the MLP, and the reconstructed feature matrix is $\hat{X}$, wherein each feature vector $\tilde{x}_i$ in the reconstructed feature matrix is $\hat{X}$ is aggregated as:

$$\tilde{x}_i = x_i + \text{sum}(\text{Mask} \times M, \text{axis} = 1);$$

wherein a sum function represents calculating a sum of matrices column-wise.

19. The computer hardware device according to claim 10, wherein
a curvature mapping module for the trusted graph data node classification method is the MLP with a bias of 1, the curvature mapping module uses a leaky rectifier linear unit (LeakyRelu) activation function with α=0.2, and the curvature mapping module normalizes a final curvature matrix row-wise to obtain the mapped curvature matrix ψ;
a curvature aggregation module for the trusted graph data node classification method is a curvature-based hidden layer node feature aggregation module, the curvature aggregation module replaces a Laplacian matrix in a traditional graph convolutional network (GCN) by a mapped curvature value, and the curvature aggregation module uses an inter-layer aggregation formula as follows:

$$H_x^{l+1} = \sigma_l(\Sigma_{y \in N(x)} \text{diag}(\psi_{xy}^l) W^l H_y^l); \text{ and}$$

network parameters of each module in a graph neural network (GNN) model are updated synchronously by using a backpropagation algorithm during a semi-supervised learning and training process.

20. The computer hardware device according to claim 10, wherein
a node prediction model for the trusted graph data node classification method uses a node feature vector output from a last layer of a GNN to pass through a fully-connected layer network, the node prediction model uses softmax as an activation function to obtain a probability distribution of the nodes, and the node prediction model takes a class with a largest predicted probability as a predicted result of the nodes.

* * * * *